Jan. 29, 1957  E. W. CHIDESTER  2,779,080
MOLDING MACHINE FOR FORMING CONCRETE CRIBBING BLOCKS
Filed Nov. 8, 1951  4 Sheets-Sheet 1
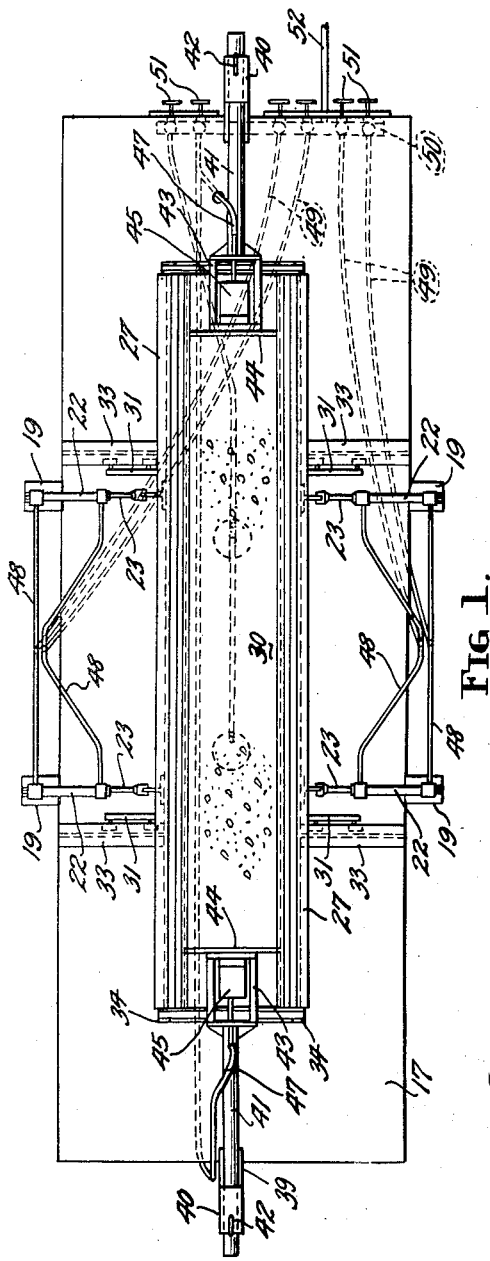
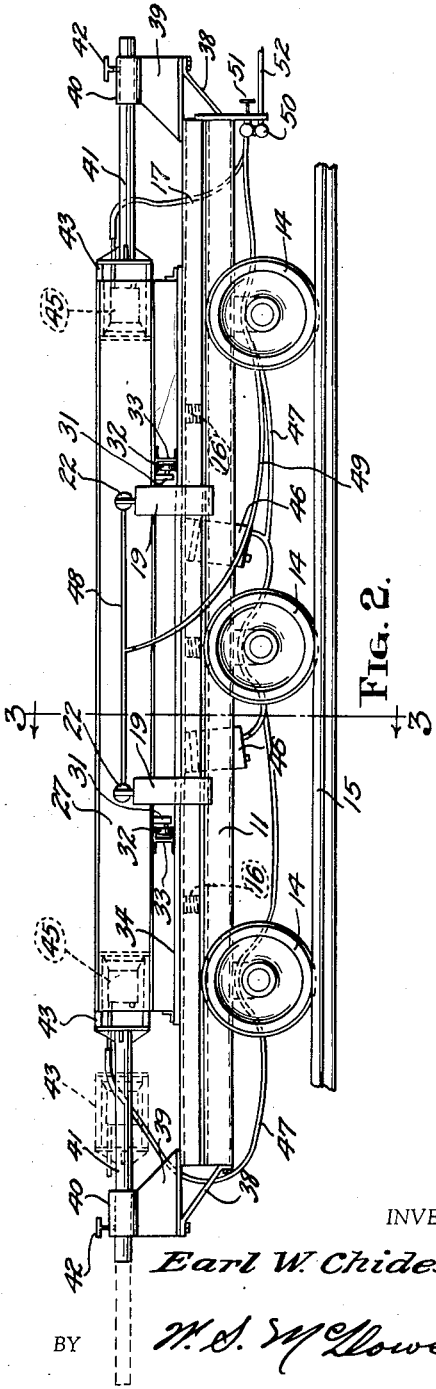
INVENTOR
*Earl W. Chidester*
BY
*W. S. McDowell*
ATTORNEY Jan. 29, 1957 E. W. CHIDESTER 2,779,080
MOLDING MACHINE FOR FORMING CONCRETE CRIBBING BLOCKS
Filed Nov. 8, 1951 4 Sheets-Sheet 2
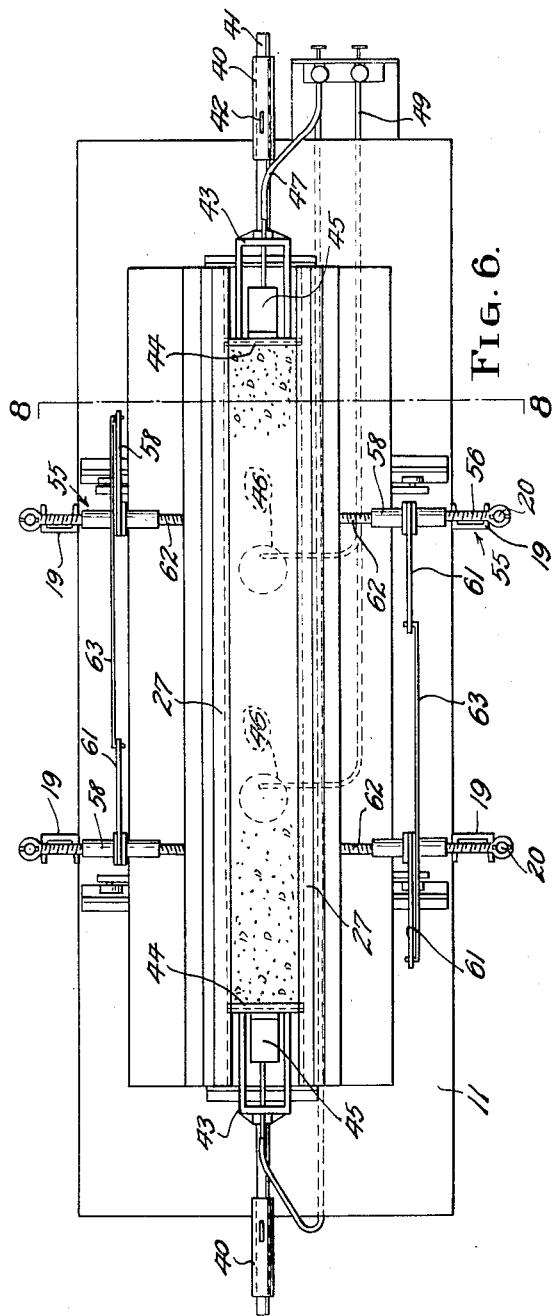
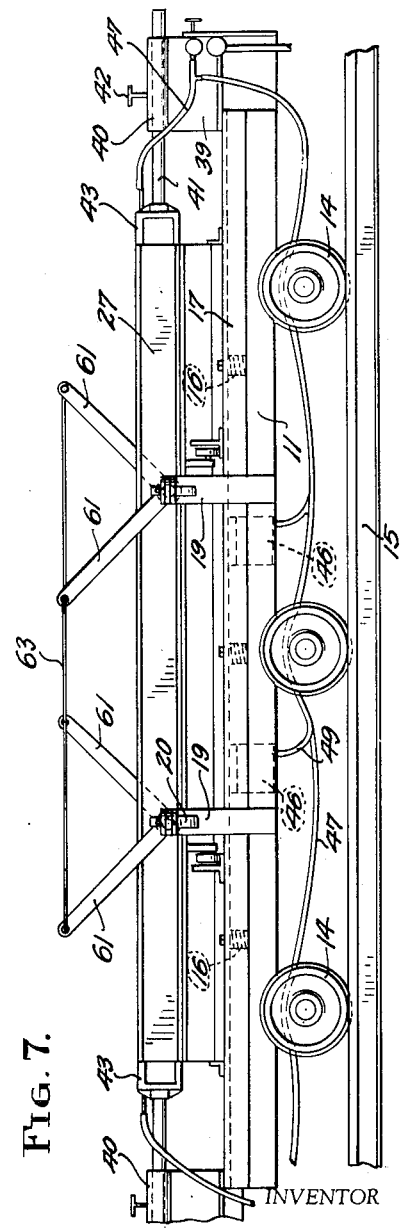
INVENTOR
*Earl W. Chidester*
BY
ATTORNEY Jan. 29, 1957 E. W. CHIDESTER 2,779,080
MOLDING MACHINE FOR FORMING CONCRETE CRIBBING BLOCKS
Filed Nov. 8, 1951 4 Sheets-Sheet 3

INVENTOR
*Earl W. Chidester*

BY *W. S. McDowell*

ATTORNEY

Jan. 29, 1957  E. W. CHIDESTER  2,779,080
MOLDING MACHINE FOR FORMING CONCRETE CRIBBING BLOCKS
Filed Nov. 8, 1951  4 Sheets-Sheet 4

INVENTOR
*Earl W. Chidester*

BY *M. S. McDowell*
ATTORNEY

United States Patent Office 2,779,080
Patented Jan. 29, 1957

2,779,080

MOLDING MACHINE FOR FORMING CONCRETE CRIBBING BLOCKS

Earl W. Chidester, Fairmont, W. Va., assignor, by mesne assignments, to American-Marietta Company, Chicago, Ill., a corporation of Illinois Application November 8, 1951, Serial No. 255,379

3 Claims. (Cl. 25—41)

The present invention relates generally to molding apparatus, and more specifically to an improved machine for molding elongated rectangular concrete blocks, commonly referred to as cribbing blocks.

In recent years, concrete cribbing blocks have become increasingly popular and useful in the construction of retaining walls for shoring up or supporting embankments, bridge abutments, and bridge approaches, or the like. Such cribbing blocks advantageously replace previously used wooden logs or solid walls formed from concrete, bricks, or continuously laid block, the cribbing blocks being arranged in vertically stacked parallel order with the end portions of the individual blocks being overlapped by the end portions of a second stack of blocks disposed in angular relation to the first stack in the manner of the wall structure of a log cabin or the like.

In accordance with prior practice, cribbing blocks are usually formed or cast in individual stationary molds into which a cementitious mix is introduced and allowed to set and cure for a relatively long period of time prior to the removal of the finished cribbing block from the mold. It will be understood that the relatively long curing time for such cribbing blocks results in a tie-up of the mold for a considerable period of time before the same may be used for the casting of another cribbing block. Thus, to produce cribbing blocks in any sizable quantity, it has heretofore been necessary for the manufacturer to maintain a large number of such molds, thus materially increasing the amount of capital tied up in molding apparatus, and the cost of manufacturing cribbing blocks.

It follows, therefore, that the primary object of the present invention is to provide a molding machine for concrete cribbing blocks which is capable of forming or molding a number of cribbing blocks during an ordinary work day, and wherein provision is made for the initial formation of a cementitious mix into the desired shape of the cribbing block within the machine, and wherein the block, while still in a plastic formative state, is removed from the machine upon a supporting pallet and permitted to set and cure for the requisite period of time independently of, and remotely from, the forming machine, thereby enabling the machine to receive and form a relatively large number of blocks while previously formed blocks are setting and curing.

It is another object of the invention to provide a molding machine for concrete cribbing blocks which comprises a mobile frame upon which is mounted opposed parallel side and end wall-forming members between and below which is adapted to be positioned a removable pallet, and wherein the side and end walls are movable relatively inwardly with respect to the pallet to form an open-topped molding chamber into which fluid or plastic cementitious materials may be introduced and vibrated to provide a cribbing block in a formative state which may be removed, together with the pallet member, from the machine to a remote location for curing and setting.

A further object of the invention is to provide a molding machine of the character set forth having movable side and end wall members which may be actuated between mold-forming and mold-opening positions in a quick and facile manner, thereby to enable an initially cast cribbing block to be quickly removed from the machine and a second pallet inserted therein to prepare the machine for a second casting operation.

For a further and more detailed understanding of the invention and the various additional objects and advantages realized therefrom, reference is to be had to the following description and the accompanying drawings, wherein:

Fig. 1 is a top plan view of a cribbing block-molding machine formed in accordance with the present invention;

Fig. 2 is a side elevational view thereof;

Fig. 6 is a top plan view similar to Fig. 1 showing a modified form of the invention;

Fig. 7 is a side elevational view of the machine disclosed in Fig. 6;

Figure 3:
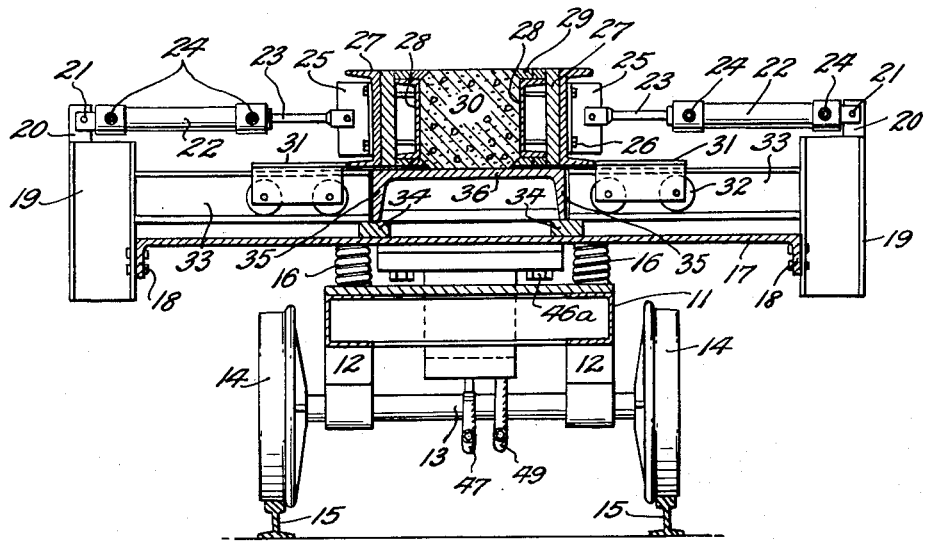
Fig. 3 is a transverse vertical sectional view taken along the line 3—3 of Fig. 2.

Referring now to the drawings, and more particularly to Figs. 1–4, it is to be noted that the present block-forming machine comprises a mobile frame 11 provided with a plurality of depending and transversely spaced axle-supporting bolsters 12 which carry transversely extending wheel-supporting axles 13 mounting rail-engaging wheels 14 at either end thereof, and providing for travel of the mobile base over a system of spaced parallel tracks 15.

Mounted at spaced intervals along the upper surface of the bed frame 11 are a plurality of coil compression springs 16 whose upper ends are engaged with and support a relatively wide and flat bed member 17. The outer edges of the bed member overhang the wheels 14 on either side of the machine, and are provided with downwardly turned edge flanges 18 to which are bolted opposed pairs of upstanding bolsters 19. The bolsters 19 terminate at their upper ends in upstanding sets of attachment ears 20 to each of which is attached, as at 21, the inner end of a fluid-pressure-actuated ram 22. The rams 22 may be either pneumatically or hydraulically actuated, and are provided with longitudinally extensible piston rods 23 which are movable in response to the introduction of fluid pressure within a pair of fluid inlet-outlet ports 24 formed in either end of the ram casing 22. The outer ends of the piston rods 23 are bolted to an angular attachment plate 25 which, in turn, is bolted, as at 26, to a longitudinally extending I-beam member 27. The inner side of the I-beam member 27 carries a channeled and longitudinally co-extensive mold board 28 which defines one side wall of the block-molding cavity. The inner side edges of the I-beam members 27 are beveled, as at 29, inwardly toward the mold boards 28, in order to provide beveled corner surfaces upon the cribbing block 30 formed within the machine.

Each of the I-beam members 27 is provided with laterally extending sets of roller-carrying brackets 31 which, in turn, rotatably support pairs of rollers 32 which are guided and roll within the channels provided in transversely extending channel bars 33 which are stationarily carried by the bed 17. In this manner, the I-beam members 27 and the mold boards 28 carried thereby are arranged for transverse movement on the frame 17 in response to the actuation of the fluid-pressure-actuated rams 22, and may be moved transversely inwardly and outwardly with respect to the longitudinal center line of the machine between mold-forming and mold-opening positions.

Positioned upon the bed 17 are a pair of longitudinally coextensive guide supports 34 which form a supporting bed for the downwardly turned flanges 35 formed on a shallow inverted U-shaped pallet member 36. As shown particularly in Figs. 3 and 4, the pallet member 36 has its upper surface defining the bottom wall of the molding cavity, and is positioned along the longitudinal center line of the bed 17 immediately below the plane of the I-beam members 27, and between the opposed sets of channeled guide members 33.

In operation, the pallet member 36 may be removed from or inserted within the machine when the I-beam members 27 occupy their mold-opening positions, in order that an initially formed cribbing block 30 may be removed from the machine on the pallet member 36 prior to the complete setting or curing of the cementitious mix from which the block 30 is formed.

Carried at either end of the frame 11, by means of diagonal attachment brackets 38, are a pair of longitudinally spaced bolsters 39 which are provided at their upper ends with tubular bearing sleeves 40 slidably receiving elongated shafts or rods 41. Each of the bearing sleeves 41 is provided with a set screw tensioning device 42 so arranged as to clamp the shafts 41 rigidly within the sleeve to prevent longitudinal movement thereof. The inner end of each shaft 41 is provided with a rectangular open boxing 43 which carries at its end a flat upstanding end wall-forming plate 44 arranged to slide between the mold boards 28 when the latter occupy their mold-forming or closed positions, whereby to provide or define the end walls of the molding cavity. The end walls 44 may be retracted to a mold-opening position by sliding the shafts 41 longitudinally outwardly with respect to the bearing sleeves 40, whereby to provide vertical clearance for removal of the pallet member 36, the retracted position of the end wall-forming plates 44 and the boxings 43 being shown in broken lines in Fig. 2.

Carried within each of the boxings 43 which support the end wall-forming plates 44 is a pneumatically actuated vibrator 45 which abuts the plates 44 to impart vibrational forces thereto to facilitate molding operations after the pouring of the cementitious mix within the mold-forming cavity.

Also, there is provided beneath the bed 17, in the approximate central region thereof, a pair of relatively larger pneumatically operated vibrators 46 which are bolted, as at 47, to the under side of the bed 17 to impart vibrational forces to the entire bed and mold-forming assemblies carried thereon.

Each of the vibrators 45 and 46 is provided with suitable remotely extending flexible hose connections 47 through which pneumatic pressure may be introduced to the vibrators to actuate the same and cause the separate wall components of the mold to vibrate a cementitious mix introduced therein, and thereby to increase materially the compaction of the mix and the consequent strength qualities of the block.

As shown particularly in Figs. 1 and 2, the individual fluid-pressure-actuated rams 22 have their inlet-outlet ports connected by manifold conduits 48 which, in turn, are in fluid communication with one end of remotely extending flexible conduit members 49 leading to a valving manifold 50 carried at one end of the frame 11. Each of the hoses or lines 49 is provided at the manifold 50 with manually operable valve members 51 operable to control the flow of pressure fluid to the respective ends of the rams 22 and thereby control the longitudinal extension or retraction of the piston rods 23 and the side wall members of the mold. The manifold 50 is provided with a remotely extending inlet conduit 52 which may advantageously be connected with a source of compressed air or pressurized hydraulic fluid, not shown.

Figure 8:
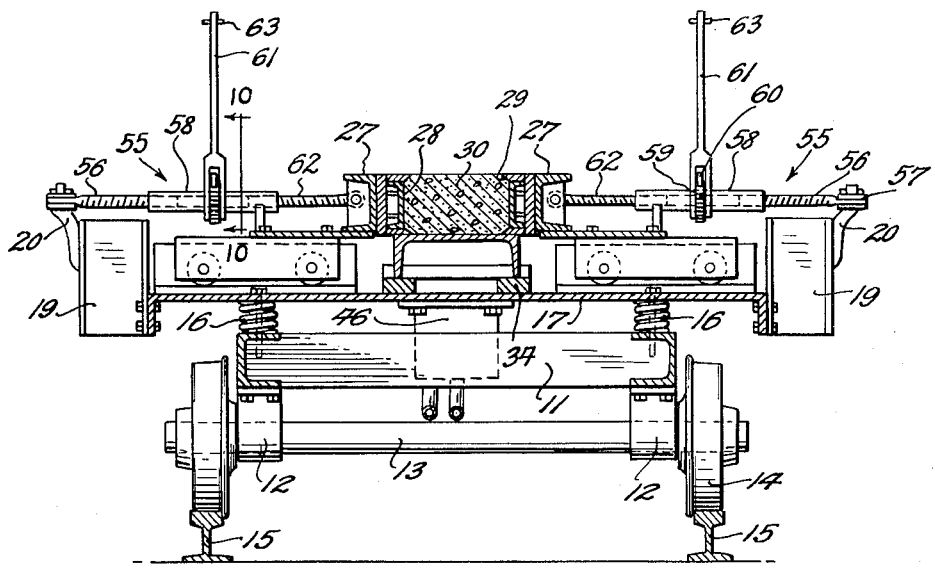
Fig. 8 is a transverse vertical sectional view taken along the line 8—8 of Fig. 6.
Figure 9:
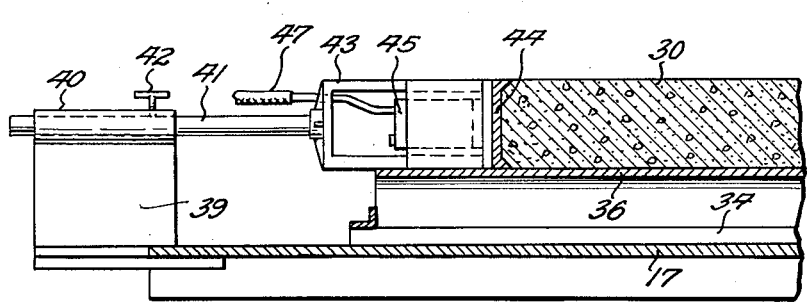
Fig. 9 is a fragmentary longitudinal vertical sectional view taken through one of the ends of the cribbing block-forming machine.

Figs. 6–8 of the drawings disclose a slightly modified form of apparatus wherein the fluid-pressure-actuated rams 22 for moving the side wall members of the mold are replaced by sets of longitudinally extensible and retractable turnbuckle members, generally designated by the numeral 55. Each of the turnbuckle members comprises a first screw-threaded shaft 56 which is secured at its outer end, as at 57, to the upstanding ears 20 provided on the side bolsters 19. The opposite screw-threaded end portion of the shaft 56 is received within a cooperatively threaded sleeve 58 which is provided in its central region with a ratchet gear 59 adapted to be rotated upon engagement with a ratchet pawl 60 carried upon a ratchet handle 61 rotatably supported upon the sleeve 58. The opposite end of the sleeve 58 threadedly receives a second screw-threaded shaft 62 having threads oppositely pitched from those on the shaft 56, and having its inner end portion securely connected with the angle brackets 25 joining the I-beam members 27.

As shown particularly in Figs. 6 and 7, the upper end of each of the handles 61 is connected with an adjacent handle by means of connector rods 63 in order that each set of handles on either side of the machine may be actuated in unison to increase or decrease the effective lengths of the turnbuckle members 55 and thereby move the I-beam side wall-forming members inwardly and outwardly with respect to the longitudinal center line of the machine.

Figure 10:
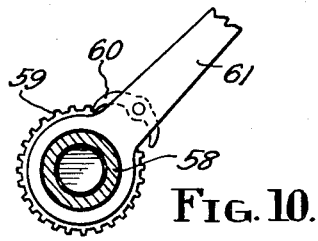
Fig. 10 is a detail vertical sectional view taken along the line 10—10 of Fig. 8.

Referring to Fig. 10, it will be seen that the pawl member 60 is arranged so as to extend on either side of the handle 61 and may be manually adjusted so as to engage the ratchet wheel 59 when the handle 61 is moved in either direction. It will be understood that any suitable spring system may be employed in connection with the pawl 60 which may be selectively set so as to enable the pawl 60 to engage the teeth of the ratchet wheel 59 when the handle 61 is rocked in one direction and to ride over the teeth of the ratchet wheel when the handle is rocked in the opposite direction. Thus, by reciprocating the connecting rods 63 or any one of the handles 61, the turnbuckles 55 may be caused to move the side walls of the mold inwardly and outwardly between mold-forming and mold-opening positions, the latter permitting of removal of the associated pallet member 36 and a preformed cribbing block from the machine.

Figure 4:
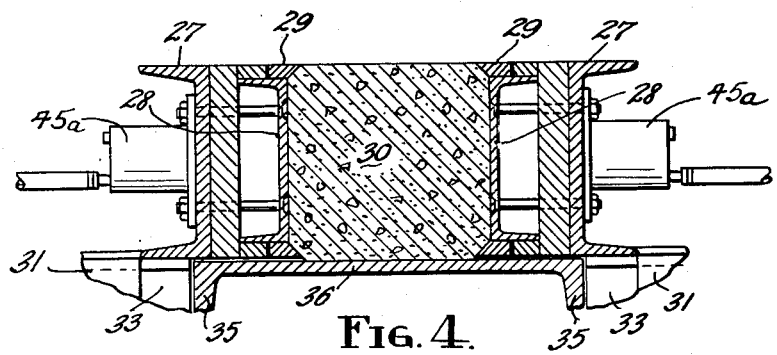
Fig. 4 is an enlarged transverse vertical sectional view taken through the mold-forming members of the present machine.
Figure 5:
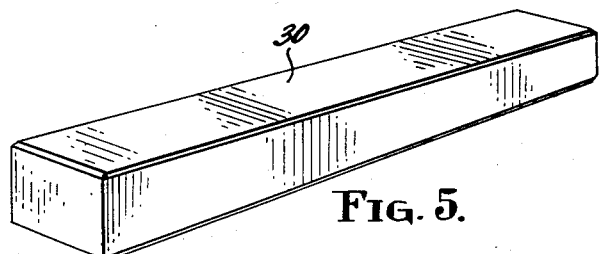
Fig. 5 is a perspective view of a concrete cribbing block formed from the machine of the present invention.

Also, if desired, the individual side walls of the mold may be provided with vibrator devices 45a, as shown in Fig. 4, in addition to the vibrators 45 and 46 associated with the end wall members and the bed 17. In certain instances, particularly in forming relatively large block, the addition of vibrators to the individual side wall members of the mold facilitates uniform compaction and density within the block and prevents adherence of the cementitious mix with the walls of the mold cavity.

In view of the foregoing, it will be seen that the present invention provides a mechanically efficient, yet structurally simple, apparatus for forming elongated rectangular cribbing blocks from cementitious materials, with provision being made for movement of the side and end walls of the mold-forming unit outwardly to an open position to permit ready removal of a preformed block and its associated supporting pallet member from the machine after the initial formation of the block. Additionally, by nature of the vibrators positioned at the ends and beneath the mold bottom, a cementitious mix introduced within the molding cavity may be efficiently and effectively compacted into a dense and structurally strong body without resorting to the use of externally applied pressures or tamping apparatus. Further, the present apparatus readily lends itself to the formation of steel reinforced concrete slabs or cribbing blocks by nature of the unobstructed and open-topped molding cavity, a suitably placed wire reinforcing system being initially placed within the molding cavity prior to or during the pouring of cementitious materials therein, whereby to enable the internal region of the finished block to be reinforced after the cementitious material has cured and set.

While preferred forms of the invention have been disclosed in detail, it will be understood that various modifications may be resorted to without departing from the spirit of the invention or the scope of the following claims.

I claim:

1. Apparatus for molding cementitious blocks, comprising: a wheeled car body adapted for track operation; a horizontally disposed imperforate bed resiliently mounted on said body, said bed projecting beyond the sides of the body; stationary laterally disposed relatively aligned guides mounted on the top of said bed, said guides having spaced inner ends defining between them a seat; a mold pallet removably positioned on said seat and removable therefrom only by upward movement, said pallet having a flat rectangular horizontally disposed upper surface; a pair of relatively movable mold-forming side members; rollered bracket extensions carried by said side members, said extensions being receivable in the guides on said bed for supporting and enabling sliding movement to be imparted to said side members to move the same between active positions of operation, in which said side members overlie the flat upper surface of said pellet, and retracted inactive positions of operation, in which said side members are withdrawn from contact with said pallet to permit of the upward removal thereof from said bed; fluid actuated means connected with the outer portions of said bed and with said side members for moving the latter between said active and retracted positions; a pair of end-forming members slidably carried by the ends of said bed, said end-forming members being movable between active positions overlying the ends of said pallet and retracted positions spaced from said pallet, said side and end members when occupying their active positions defining with said pallet an open-topped block-molding cavity for the reception of a cementitious mix, and when occupying their retracted positions, said side and end members permitting of vertical upward removal of said pallet and a molded uncured block positioned thereon from said bed; and releasable actuating means for positively moving said end members toward and from their active positions.

2. Apparatus for molding elongated blocks of cementitious composition, comprising: a vehicular base; an imperforate horizontal bed plate disposed above said base; spring means resiliently mounting said bed plate on said base for limited vertical movement with respect thereto; an elongated pallet member removably positioned for upward withdrawal only on said bed plate in a central and longitudinally disposed position; a pair of transversely spaced longitudinally extending parallel side members; supports for said side members projecting rigidly and laterally therefrom; spaced stationary guides carried by said bed plate for the slidable reception of said supports and between the ends of which guides said pallet member is retained against undue shifting movement on said plate; expansible and contractible means arranged between said side members and said bed plate for imparting horizontal sliding movement to said side members whereby to adjust the same in the horizontal plane of the upper surface of the pallet member laterally toward and away from the sides of said pallet member between active positions of mold-cavity-producing relationship with said pallet member and inactive positions of withdrawal from said pallet member, whereby to admit of the lifting of the pallet member and a cavity-molded uncured cementitious block arranged thereon bodily from said bed plate; end members complemental to and adapted to be disposed between the opposite ends of said side members in registry with the opposite longitudinal end portions of said pallet member to complete said block-molding cavity; and means for supporting said end members on said plate for movement between active positions of mold cavity formation and inactive positions of pallet member release.

3. Apparatus for molding elongated blocks of cementitious composition, comprising: a portable vehicular base, said base including a horizontally disposed bed adapted for the removable support of an elongated block-molding pallet member, said member having a flat horizontally disposed upper surface which defines the bottom of a block-molding cavity; a pair of transversely spaced, longitudinally extending, parallel side members; rigid, laterally directed supporting extensions projecting from said side members; guide means stationarily carried by said bed in which said extensions are slidably received, said guide means having relatively spaced end portions between which said pallet member may be positioned to maintain the same against lateral displacement when positioned upon said bed; expansible and contractible connections united with said bed and side members for moving the latter in a horizontal plane above the upper surface of said pallet member, and under the control of said bed-mounted guides and extensions received therein, between active positions of mold cavity-forming relationship in registry with the sides of said pallet member and inactive positions in which said side members are spaced outwardly from the sides of said pallet member to permit of the lifting of the pallet member with a molded uncured block thereon from said bed; end members complemental to said side members and adapted for active disposal between the end portions of said side members to complete said molding cavity; and means supporting said end members on said bed for sliding movement into and out of active cavity-forming relationship with the ends of said side and pallet members.

References Cited in the file of this patent

UNITED STATES PATENTS

| Number | Name | Date |
|---|---|---|
| 779,976 | Sterling | Jan. 10, 1905 |
| 1,012,835 | Frerichs | Dec. 26, 1911 |
| 1,275,121 | Bender | Aug. 6, 1918 |
| 1,421,748 | Willard | July 4, 1922 |
| 1,908,104 | Bell | May 9, 1933 |
| 2,353,492 | O'Connor | July 11, 1944 |
| 2,388,679 | Davis | Nov. 13, 1945 |
| 2,407,168 | Lindkvist | Sept. 3, 1946 |
| 2,460,167 | Carlsen | Jan. 25, 1949 |
| 2,535,389 | Canfield | Dec. 26, 1950 |